Oct. 27, 1942.       C. L. HARDY              2,300,381
                        FILTER
                  Filed April 2, 1941
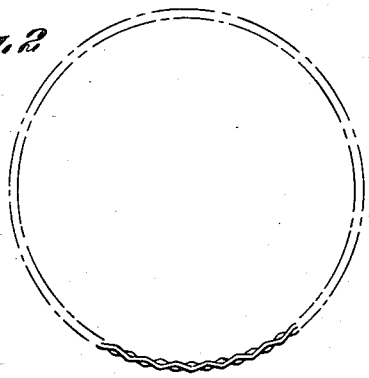
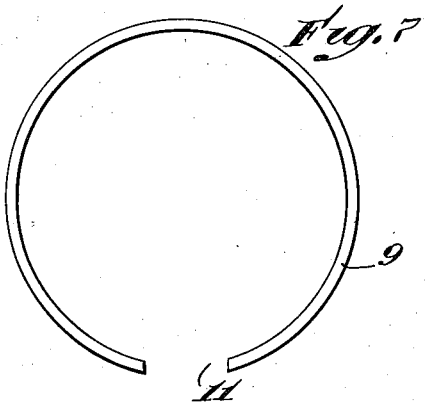
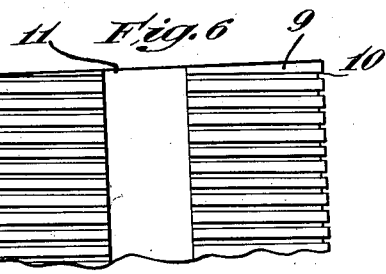
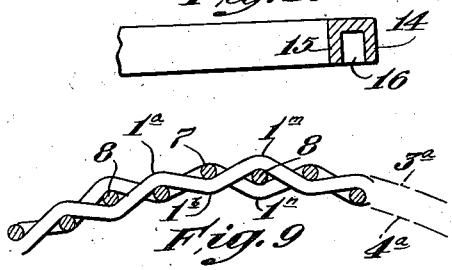
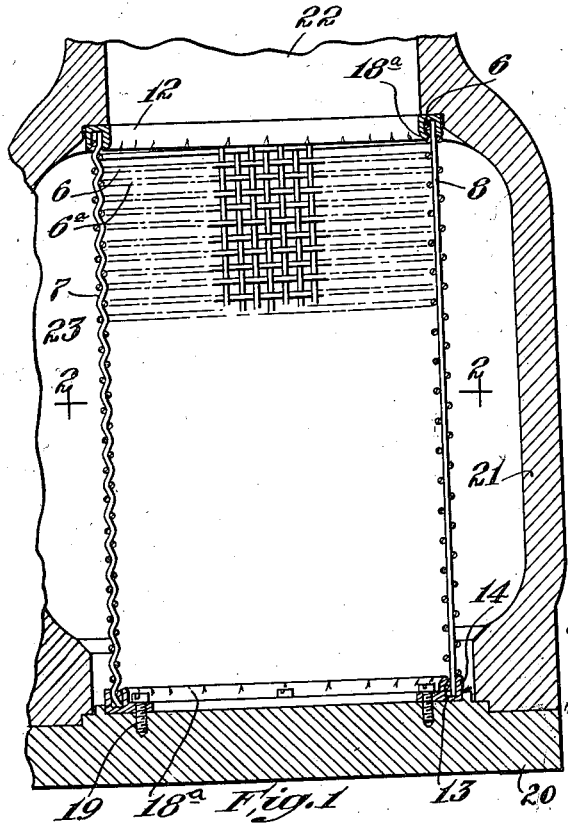
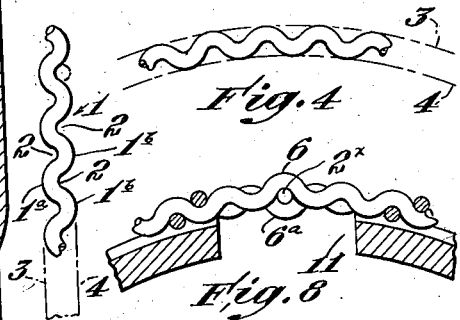
Inventor
Charles L. Hardy
by Roberts Cushman Woodberry
Attys.

Patented Oct. 27, 1942

2,300,381

UNITED STATES PATENT OFFICE 2,300,381

FILTER

Charles L. Hardy, Waban, Mass., assignor to Joseph T. Ryerson & Son, Inc., Chicago, Ill., a corporation of Delaware Application April 2, 1941, Serial No. 386,433

8 Claims. (Cl. 210—169)

This invention pertains to screens or filters designed to clean and/or to defuse a fluid, and to a method of making such filters, the specific embodiment here chosen for illustration being a cylindrical filter through which steam is passed on its way to a turbine.

Steam filters for turbines are subjected to extremely trying conditions in use. In recent steam engineering practice the tendency has been to increase steam pressures and temperatures until at the present time pressures exceeding 1800 pounds per square inch and temperatures of the order of 1000° F. are in use. Under such conditions the velocity of flow through the interstices of the filter is very high and stresses are set up which tend to distort and rapidly to erode the filter. Moreover, the great variation in temperature between the cold and the operating conditions, coupled with such mechanical stresses, makes the use of solder or even welded joints between the constituent parts of the filter unreliable and impracticable. Attempts have heretofore been made to form cylindrical filters of this kind by rolling a sheet of woven wire filter material to a cylindrical curvature and then welding its longitudinal edges together, but as just above stated, a joint so formed is unreliable under the conditions of use so that filters made in this way have proven unsatisfactory.

Screens or filters of this kind must be rigidly and reliably supported and for this purpose it is desirable to attach each end of the cylinder of screen material to a rigid supporting ring which not only stiffens the screen material and provides a finish for its ends, but also furnishes convenient means for centering the screen in the chamber in which it is housed and for rigidly attaching it to the wall of such chamber or other appropriate support, but difficulty has also been experienced in providing a permanent union between the screen and its supporting ring.

One principal object of the present invention is to provide foraminous screen material in seamless cylindrical form wherein the assembled elements are so mechanically united that the screen material is capable of withstanding all of the conditions of use without substantial distortion or variation in the mesh size, although made of a material which is extremely hard or otherwise erosion and corrosion resistant. A further object of the invention is to provide a novel method of making such filter material. A further object is to provide a substantially cylindrical seamless filter having at each end a rigid annulus so mechanically united to the screen material that the connections are not substantially affected by temperature or other extreme conditions to which the filter is exposed during use. Other and further objects and advantages of the invention will be pointed out hereafter in the following more detailed description and by reference to the accompanying drawing, wherein:

Fig. 1 is a vertical section showing the improved filter of the present invention installed in a casing;

Fig. 2 is a section substantially on the line 2—2 of Fig. 1 but omitting the casing;

Fig. 3 is a fragmentary plan view showing a length of wire useful in making the improved screen;

Fig. 4 is a fragmentary plan view showing a piece of such wire bent to constitute a portion of one turn of a helical coil;

Fig. 5 is a fragmentary side elevation of such a helical coil made from wire of the kind shown in Fig. 3;

Fig. 6 is a fragmentary elevation of a mandrel useful in making the improved filter;

Fig. 7 is a plan view of the mandrel of Fig. 6;

Fig. 8 is a fragmentary enlarged end view of the mandrel of Fig. 6 illustrating one step in the improved method of making filters;

Fig. 9 is a fragmentary horizontal section showing a cylindrical screen fabric in accordance with the present invention and to larger scale than Fig. 2; and Fig. 10 is a fragmentary diametrical section showing details of one of the end rings of the filter prior to its assembly with the screen material.

Referring to the drawing and in particular to Fig. 3, the numeral I designates a length of wire useful in forming certain elements of the screen structure. This wire is of a corrosion-resistant and preferably erosion-resistant material, for example, stainless steel, bronze, or the like, such material being stiffly resilient but capable of being permanently deformed by the application of appropriate pressure. Wire of 0.092 inch diameter has been found useful for the purpose, although it is to be understood that the diameter of the wire may be varied in accordance with circumstances and in particular with reference to the size of the screen structure and the size of mesh. Wire of the diameter just specifically mentioned is well suited to the making of a screen of No. 5 mesh and of a diameter of the order of 11 inches, and a length of the order of 18 inches.

Having provided wire of the desired characteristics and size, the first step in the operation of making the filter herein disclosed is to crimp this wire transversely, as shown in Fig. 3, in a manner well known in the wire-working art, so as to provide the wire with a series of indentations 2 intervening between successive crests 1ª and 1ᵇ. In order to emphasize the principle of the invention, these indentations 2 are shown in Figs. 3, 4 and 8 as of a depth substantially equaling the diameter of the wire so that the distance between parallel lines 3 and 4, tangent to the respective crests 1ª and 1ᵇ at opposite sides of the wire, would be approximately twice the diameter of the wire, the distance between the lines 3 and 4 thus substantially equaling the thickness of the wall of the completed screen. In actual practice these indentations or recesses 2 would ordinarily be less in depth than the diameter of the wire.

Having provided this crimped wire, a length is cut therefrom sufficient to form a helix whose several turns will constitute the wefts of the proposed foraminous woven screen fabric, this helix extending from one end to the other of the screen without break. While a single helix may thus be employed to constitute the entire weft or filling of the woven structure, it is contemplated that several helices may be employed with their turns intercalated, thus permitting the use of helices of a steeper pitch if that should be desired, without thereby unduly varying the size of mesh. Having provided this length of crimped wire, it is then coiled in any desired way to form the helix 5 (Fig. 5) having successive turns 6, 6ª, 6ᵇ, etc. longitudinally spaced apart in accordance with the desired size of mesh.

From the crimped wire there are also cut substantially straight lengths 7 designed to form warp strands each of a length substantially equaling the desired length of the finished filter. A substantial number of these lengths 7 of the crimped wire is provided and there is also provided a number of warp lengths 8 (Fig. 1) of initially substantially straight uncrimped stiffly resilient wire, such wire preferably being identical with that employed in preparing the crimped wire.

In assembling the helix 5 with the warp lengths 7 and 8 to form woven structure, it is convenient to employ a mandrel or similar support, such as shown for example in Figs. 6 and 7. As here illustrated, this mandrel is a substantially cylindrical shell of stiff but somewhat resilient material, the outer surface of this mandrel preferably being provided with a helical groove 10 having the pitch which it is desired that the helical coil 5 shall have in the completed filter. The mandrel 9 also has at one or more points a longitudinal gap or channel 11. In the instance illustrated, wherein this mandrel 9 is a hollow cylinder, the channel 11 is merely an opening or longitudinal slot through the thickness of the wall of the mandrel. On the other hand, if a multi-part solid mandrel be employed, this channel 11 may be merely a groove in the outer surface of the mandrel, such groove being somewhat deeper than the helical groove 10.

Having provided this mandrel, the helix 5, and the warp wires 7 and 8, the helix 5 is first mounted on the mandrel 9 so that the turns 6, 6ª, and 6ᵇ of the helix engage the groove 10 of the mandrel, it being manifest that these turns of the helix will bridge the channel 11 as illustrated in Fig. 8. At the point where the helical turns bridge this channel it is quite readily possible to spring apart the crests 1ª and 1ᵇ of the crimps of successive turns 6 and 6ª of the helix so as to provide between successive turns and extending longitudinally of the coil a space 2ˣ (Fig. 8) into which one of the crimped warp wires 7 may be introduced without great difficulty so as to extend longitudinally of the coil. In so interweaving the warp wire 7 with successive weft turns 6, 6ª, etc. of the helix, a one-and-one weave is preferably employed, and the turns 6, 6ª, etc. seat themselves in the successive recesses or indentations 2 of the wire 7, while the wire 7 seats itself in the recesses or indentations 2 of each helical turn. When thus arranged the turns 6 and 6ª are permitted to spring back to normal position, and since the recesses 2 of the helical turns provide space for the reception of the warp 7, the normal diameter of the helix is not substantially changed by the interweaving of the warps. Having introduced one such wire 7, the helix may be moved circumferentially on the mandrel, substantially a half-revolution, if desired, to present another pair of crests of the helical turns in position above channel 11 for separation, and another warp wire 7 is then introduced, and so on. However, at suitable intervals, in place of the wire 7, one of the straight wires 8 may be introduced. Since the wire 8 has no recesses or indentations 2, it is not possible for the turns of the helix to return fully to their normal locations after being sprung apart to permit entry of the wire 8, and the result is that every time a wire 8 is introduced the circumferential length of the helical turns of he helix is thereby slightly decreased. At the same time the wire 8 is slightly deflected but to a degree such that the elastic limit of the material is not exceeded by the pressure of the helical turns so that it assumes a very slight undulate form and is thus very firmly held in place by the coils of the helix. When, hereinafter in the description and claims, reference is made to the "deflection" of the initially straight wires 8, it is to be understood that the deflection thus referred to is such that the elastic limit of the material is not exceeded. The wires 8 may be intercalated among the wires 7 in any desired order, for instance alternately, one-in-three, one-in-four, etc.

It will be understood that in introducing the wires 7 and 8, the turns of the helix are so manipulated that the wires 7 and 8 interweave as warps with successive turns of the helix, to form a true woven structure. The introduction of the initially straight wires 8, as above noted, tends to decrease the circumferential lengths of the helical turns, thus placing the helical turns under what may be termed "hoop" tension and tending to tighten these helical turns very firmly about the wires 7.

After the weaving operation has thus been completed by the interweaving of the wires 7 and 8 with the helical turns, the mandrel 9 may be sprung inwardly so as to permit withdrawal of the completed screen cylinder from the mandrel, or if the mandrel 9 be a multi-part rigid mandrel, its parts may be disassembled to permit removal of the screen.

Since in this screen structure the helical turns are held in accurately spaced relation longitudinally of the screen in the indentations of the crimped wires 7, and since the wires 7 and 8 are held accurately spaced circumferentially by the indentations 2 of the helical turns, it is impossible, during the use of the screen, for its constituent elements to shift so as thereby to vary the size of the mesh to any substantial degree.

Moreover, the structure having once been completed in this manner, is shape-retaining, stiff and strong, and being made of material which is hard, corrosion and erosion resistant, is capable of withstanding the conditions of use such as the impact of high velocity steam and wide range in temperature, without rapid deterioration, distortion or destruction.

This cylindrical filter fabric may, if desired, be made in lengths substantially longer than the intended filter, and from such lengths of cylindrical material suitable portions may be cut to form the desired individual filters.

Preferably each individual filter is provided at its opposite ends with a rigid supporting ring in order to give it added strength and to protect it from mechanical injury. As illustrated in Fig. 1, the filter is provided with a top ring 12 and a bottom ring 13. These rings may be made of any suitable material, but preferably a material which is somewhat malleable, so that it may be bent or deformed as hereafter described. Bronze or some such corrosion-resistant material is desirable for the purpose. As illustrated in Fig. 10, the ring 12 is formed with an outer circumferential wall 14 and with an inner wall 15 spaced from the wall 14 to provide the annular channel 16. In assembling the screen cylinder with this ring the upper edge of the screen is introduced into the channel 16 and then all or portions of the free edge 18a of the wall 15 are forced over into engagement with the screen material, preferably so as to embrace the upper turn 6 of the helical coil, thereby pinching the screen material against the wall 14 and providing a mechanical interlock such as permanently to secure the screen and ring together without requiring the use of solder, brazing, welding or the like, all of which have proven unsatisfactory for use in devices of this type.

The lower ring 13 may be substantially identical with the ring 12 as above described, and may be secured to the lower end of the screen in the way above described, but as here illustrated, is provided with a radial flange having openings for the reception of attaching bolts 19.

These bolts secure the screen structure to the lower head 20 of the filter housing 21 forming a part, for example, of a throttle valve casing. The upper ring 12 seats in a suitable recess in the interior of the casing 21, the latter having the inlet passage 22 which is concentric with the screen or filter, and having the delivery passage or chamber 23 which surrounds the screen and into which the stem is delivered through the interstices or meshes of the screen fabric.

In accordance with a modification of the above-described method of making the seamless cylindrical screen structure, a weft helix of crimped wire is first prepared and placed upon the mandrel 9 as above described, but in this instance the helix has its turn spaced substantially twice as far apart (for a desired mesh size) as they would be in the practice of the previously described method. The crimped warp wires are now merely arranged in parallel relation so as to overlie the turns of the helix (without interweaving them with the turns of the helix) but in such a way that the turns of the helix seat in indentations or recesses of the warp wires. A second helix of crimped wire of slightly greater diameter than the first, and having its turns similarly spaced apart, is now prepared, either by forming it upon a separate mandrel and slipping it endwise over the assembled crimped warp wires and the first helix, or by directly winding the wire about the assembled crimped warp wires to form the helix, this second helix being so arranged, in either instance, that its turns intervene between those of the first helix, although this second helix is wholly exterior to the assembled crimped warp wires. The turns of this second helix are seated in intervening recesses of the crimped warp wires so that the turns of both helices are firmly held in properly spaced relation while the crimped warp wires are likewise held in circumferentially spaced relation by their engagement with the recesses of the helical turns. Straight warp wires are now interposed in the spaces between adjacent crimped warp wires, and these straight wires are interwoven with the turns of the two helices, the straight wires lying at the inside of the turns of the first helix and outside of the turns of the second helix. In thus interweaving the straight wires, the latter are slightly deflected from a straight line at the points where they cross the helical weft turns and thus place the weft turns under stress so that the crimped warp and weft wires are positively locked together, thus insuring uniformity of mesh regardless of the stresses to which the screen may be subjected. The structure resulting from this second method is substantially identical with that resulting from the first method, but avoids the difficulties incident to the actual interweaving of the crimped warp wires with the helical weft turns. The second method thus expedites the production of the article and reduces its cost as compared with the first described method.

While certain desirable embodiments of the invention have herein been described by way of example, it is to be understood that the invention is not necessarily limited to this precise construction, but is to be regarded as broadly inclusive of any and all modifications both of structure and method which fall within the scope of the appended claims.

I claim:

1. A seamless cylindrical filter comprising longitudinally extending warp strands interwoven with helically extending weft elements, the weft elements being transversely pre-crimped and a portion at least of the warp strands being transversely pre-crimped, certain other of the warp strands being initially substantially straight and stiffly resilient, said initially straight warp strands being transversely deflected within their elastic limits within the completed structure at the points where they cross the weft elements, thereby establishing a stress in the material which opposes bodily movement of the crimped warp strands.

2. A seamless cylindrical filter comprising longitudinally extending warp strands interwoven with helically extending weft elements, certain of the warp strands being transversely pre-crimped thereby providing recesses in which successive turns of the helical weft elements are seated, certain at least of the warp strands which are intercalated among the crimped warp strands being resilient and initially substantially straight but in the completed structure being slightly deflected transversely within their elastic limits thereby opposing bodily movement of the crimped warp strands.

3. A seamless cylindrical filter comprising longitudinally extending warp strands interwoven with a transversely pre-crimped weft strand arranged to form an open helical coil, certain of the warp strands being transversely pre-crimped, the crimps of the warps and wefts being so arranged as positively to prevent variation of the spacing of the turns of the coil or variation in the circumferential spacing of the crimped warps, certain of the warp strands being stiffly resilient and initially substantially straight but being so deflected in the completed structure at their crossings of the weft within their elastic limits as to exert substantial radial pressure upon the latter.

4. A seamless cylindrical foraminous filter comprising circumferentially spaced longitudinally extending elements interwoven with a helically coiled strand, said longitudinal elements having therein permanent transverse offsets operative to prevent relative longitudinal movement of adjacent turns of the helically coiled strand, and holding means rigidly engaging the turns of said helical strand to prevent variation in the circumferential spacing of the longitudinally extending elements.

5. A seamless cylindrical foraminous filter comprising circumferentially spaced longitudinally extending elements interwoven with a helically coiled strand, said helically coiled strand having permanent transverse offsets operative to prevent relative circumferential movement of the longitudinally extending elements, and holding means rigidly engaging the turns of said helical strand to prevent variation in the spacing of the turns of the helical strand.

6. A seamless cylindrical filter structure of wire mesh fabric, said fabric comprising a plurality of wires constituting a set of longitudinally extending elements and a wire disposed in an open coil helix whose turns constitute a set of circumferentially extending elements, each of the aforesaid wires being so permanently shaped as to have a series of indentations, the several elements of the circumferential set being seated in the indentations of the elements of the longitudinal set and the elements of the longitudinal set being seated in the indentations of the circumferential set, and means, including longitudinally extending strands interwoven with the circumferentially extending elements, operative to prevent escape of the several elements from the indentations in which they are seated.

7. A seamless cylindrical filter structure of wire mesh fabric, said fabric comprising a plurality of wires constituting a set of longitudinally extending elements and a wire disposed in an open coil helix whose turns constitute a set of circumferentially extending elements, each of the aforesaid wires being permanently crimped to provide a series of indentations, the several elements of the circumferential set being seated in the indentations of the elements of the longitudinal set and the elements of the longitudinal set being seated in the indentations of the circumferential set, and a plurality of resilient, initially substantially straight, stiffly resilient longitudinal members intercalated among the crimped longitudinal elements and interwoven with the circumferentially extending elements and operative to prevent escape of the several elements from the indentations in which they are seated.

8. A seamless cylindrical filter structure of wire mesh fabric, said fabric comprising a plurality of wires constituting a set of longitudinally extending elements and a wire disposed in an open coil helix whose turns constitute a set of circumferentially extending elements, each of the aforesaid wires being permanently shaped to have a series of alternating projections and indentations, the several elements of the circumferential set being seated in the indentations of the elements of the longitudinal set and the elements of the longitudinal set being seated in the indentations of the circumferential set, and a plurality of stiffly resilient, initially straight, stiffly resilient longitudinal wires intercalated among the crimped longitudinal elements, said normally straight wires being interwoven with the circumferentially extending elements and transversely stressing the latter.

CHARLES L. HARDY.